US012121136B2

(12) United States Patent
Wachter et al.

(10) Patent No.: US 12,121,136 B2
(45) Date of Patent: Oct. 22, 2024

(54) PROTECTIVE TOOL RECEPTACLE APPARATUS

(71) Applicants: Zachary Wachter, Kenosha, WI (US); Keith Smith, Winthrop Harbor, IL (US)

(72) Inventors: Zachary Wachter, Kenosha, WI (US); Keith Smith, Winthrop Harbor, IL (US)

(*) Notice: Subject to any disclaimer, the term of this patent is extended or adjusted under 35 U.S.C. 154(b) by 325 days.

(21) Appl. No.: 17/893,653

(22) Filed: Aug. 23, 2022

(65) Prior Publication Data

US 2024/0090653 A1 Mar. 21, 2024

Related U.S. Application Data

(60) Provisional application No. 63/236,331, filed on Aug. 24, 2021.

(51) Int. Cl.
*A45F 5/00* (2006.01)
*B25H 3/02* (2006.01)

(52) U.S. Cl.
CPC ................. *A45F 5/00* (2013.01); *B25H 3/02* (2013.01); *A45F 2005/008* (2013.01); *A45F 2200/0575* (2013.01)

(58) Field of Classification Search
CPC ... A45F 5/02; A45F 2200/0575; A41D 27/20; B65D 25/107; B65D 25/04; B25H 3/00
USPC ........ 224/904, 679, 682, 231, 245; 220/674, 220/669; 206/338
See application file for complete search history.

(56) References Cited

U.S. PATENT DOCUMENTS

| | | | | | |
|---|---|---|---|---|---|
| 2,452,400 | A | * | 10/1948 | Stevens | A45D 8/185 211/DIG. 1 |
| 2,903,127 | A | * | 9/1959 | Dorman | B65D 25/04 220/523 |
| 3,239,057 | A | * | 3/1966 | Manz | B23K 37/053 224/191 |
| 4,608,716 | A | | 9/1986 | Brumfield | |
| 4,923,105 | A | * | 5/1990 | Snyder | A45F 5/02 224/255 |
| 4,928,823 | A | * | 5/1990 | Campbell | A45C 13/02 224/679 |
| 4,932,576 | A | * | 6/1990 | Ashley | A45F 5/02 224/904 |
| 4,942,991 | A | * | 7/1990 | Lyons | F42B 39/02 89/34 |
| 4,993,614 | A | * | 2/1991 | Bonofiglo | B25H 3/00 224/684 |
| 5,004,136 | A | | 4/1991 | Leath | |
| 5,152,443 | A | | 10/1992 | Hagan | |

(Continued)

*Primary Examiner* — Justin M Larson
(74) *Attorney, Agent, or Firm* — Lesavich High-Tech Law Group, S.C .; Stephen Lesavich

(57) ABSTRACT

A protective tool pouch apparatus. The protective tool pouch apparatus includes a receptacle component for accepting and holding tools and/or building materials. The protective tool pouch apparatus includes keeping tools and/or building materials in a vertical orientation with friction and/or magnetics and/or grooves and/or ridges and/or removable dividers in a pre-determined size for preventing the tools and/or building materials from wearing a bottom surface and/or creating a hole in the bottom surface of the receptacle component. The protective tool pouch apparatus can be used as a standalone component and/or inserted into existing tool belts, arm belts, apron pockets, vest pockets, holsters, bags, pouches, clothing pockets, backpack pockets, etc.

20 Claims, 7 Drawing Sheets

(56) References Cited

U.S. PATENT DOCUMENTS 5,174,482 A * 12/1992 Rogers .................... F42B 39/02 224/679
5,181,637 A * 1/1993 Santilli .................... B25H 3/00 224/679
D333,040 S * 2/1993 Dancyger ...................... D3/228
5,385,281 A 1/1995 Byrd
5,497,923 A 3/1996 Pearson
5,501,382 A * 3/1996 Webb ........................ A45F 5/02 224/672
5,511,705 A 4/1996 Dreszer
5,791,538 A 8/1998 Bain, III
5,899,355 A * 5/1999 Claydon ............ B21D 51/2646 220/674
5,941,438 A 8/1999 Price
6,176,403 B1 1/2001 Svare et al.
6,213,365 B1 4/2001 Stocke et al.
6,503,148 B2 1/2003 Lane
6,526,968 B1 3/2003 Izuchukwu et al.
6,571,997 B2 * 6/2003 Dedrick .................... A45F 5/00 224/183
6,659,321 B2 * 12/2003 Hartranft ................. B25H 3/00 224/230
6,675,965 B2 * 1/2004 Holland .................... A45F 5/02 206/338
6,698,632 B1 3/2004 Turner, Jr. et al.
6,907,620 B2 6/2005 Sullivan-West
7,032,748 B2 * 4/2006 Conklin ................... B25H 3/00 206/349
7,824,241 B2 11/2010 Duprey
8,251,064 B2 8/2012 Sanders
8,463,765 B2 6/2013 Lesavich
9,037,564 B2 5/2015 Lesavich et al.
9,137,250 B2 9/2015 Lesavich et al.
9,361,479 B2 6/2016 Lesavich et al.
9,402,458 B2 8/2016 Kooyers
9,451,820 B2 * 9/2016 Lukin .................... B65D 51/00
9,569,771 B2 2/2017 Lesavich et al.
9,765,806 B2 9/2017 Busch
9,826,819 B2 * 11/2017 Huang ..................... B25H 3/00
9,839,248 B1 12/2017 Roberson
10,051,948 B2 8/2018 Carver et al.
10,231,500 B2 3/2019 Roberson
11,166,506 B2 11/2021 Roberson
2002/0113107 A1 * 8/2002 Hartranft ................. B25H 3/00 224/904
2002/0173368 A1 11/2002 Lane
2004/0055075 A1 3/2004 Sullivan-West
2004/0226972 A1 11/2004 Cook
2006/0027187 A1 2/2006 Nicastro
2006/0096875 A1 * 5/2006 Smith ..................... A45F 5/021 206/338
2006/0023750 A1 10/2006 Moore
2009/0098800 A1 4/2009 Duprey
2011/0197891 A1 8/2011 Sanders
2011/0208710 A1 8/2011 Lesavich
2011/0303715 A1 12/2011 Mosley
2012/0170873 A1 * 7/2012 Mathews ............... B65D 33/30 383/33
2012/0278622 A1 11/2012 Lesavich et al.
2013/0048419 A1 2/2013 Nichols
2014/0061275 A1 3/2014 Egan
2014/0189792 A1 7/2014 Lesavich et al.
2014/0353353 A1 12/2014 Egan
2014/0367438 A1 12/2014 Hunt
2014/0367440 A1 12/2014 Kooyers
2015/0379301 A1 12/2015 Lesavich et al.
2016/0302556 A1 10/2016 Brown
2016/0318200 A1 11/2016 Wright
2016/0321654 A1 11/2016 Lesavich et al.
2016/0338451 A1 11/2016 Scoffier
2016/0338478 A1 11/2016 Kooyers
2017/0014984 A1 1/2017 Rola
2017/0065067 A1 3/2017 Carver
2017/0112266 A1 4/2017 Constanzo
2018/0023610 A1 1/2018 Busch
2018/0084893 A1 3/2018 Landano
2018/0206568 A1 7/2018 Roberson
2020/0000164 A1 1/2020 Roberson
2022/0054872 A1 2/2022 Kils
2022/0095724 A1 3/2022 Roberson

* cited by examiner

PROTECTIVE TOOL RECEPTACLE APPARATUS

CROSS REFERENCES TO RELATED APPLICATIONS

This U.S. Utility patent application claims priority to U.S. Provisional patent application 63/236,331, filed Aug. 24, 2021, the contents of which are incorporated by reference.

FIELD OF INVENTION

This application relates to pouches for holding tools. More specifically, it relates to a protective tool pouch apparatus.

BACKGROUND OF THE INVENTION

Tools and other building materials such as nails, screws, bolts, rivets, electrical components, plumbing components, etc. are carried, used and transported on a daily basis from tool belts, aprons, holsters, bags, pouches and in a user's pockets in a shirt, jacket, pants, etc.

Most tool belts, aprons, holsters, bags, pouches, user pockets are made from cloth materials, leather materials or some other type of fabric materials.

There are several problems associated with such tool belts, aprons, holsters, bags, pouches, user pockets, etc. made from cloth materials, leather materials or some other type of fabric materials.

One problem is that a bottom surface of the tool belts, aprons, holsters, bags, pouches, user pockets experiences wearing and becomes thin due to the movement of tools in and out many times on a daily basis, weekly basis, monthly basis, etc. and the poking of sharp ends of tools and building materials into the bottom surface. This wearing allows the tools and building materials to poke through the bottom surface of the tool belts, aprons, holsters, bags, pouches, user pockets causing injury to the user, accidental loss of the tool, damage to the tools, loss of the building materials, damage to the building materials, etc.

Another problem is that the side surfaces of the tool belts, aprons, holsters, bags, pouches, user pockets also experiences wearing expansion of the side surfaces. Such expansion allows tools to change their orientation from a vertical orientation into a semi-horizontal or horizontal orientation allowing the tools and building materials to become stuck or jammed into the tool belts, aprons, holsters, bags, pouches, user pockets, making removable difficult.

Another problem is that when a bottom surface or a side surface of the tool belts, aprons, holsters, bags, pouches, etc. experience wearing or holes in the surfaces develop, the tool belts, aprons, holsters, bags, pouches, etc. must be discarded and a new tool belt, apron, holster, bag, pouch, etc. purchased.

Thus, it is desirable to solve some of the problems associated with the tool belts, aprons, holsters, bags, pouches, user pockets used to store and transport tools and building materials.

SUMMARY OF THE INVENTION

In accordance with preferred embodiments of the present invention, some of the problems associated with tool belts, aprons, holsters, bags, pouches, etc. are overcome. A protective tool pouch apparatus is presented.

The protective tool pouch apparatus includes a receptacle component for accepting and holding tools and/or building materials. The protective tool pouch apparatus includes keeping tools and/or building materials in a vertical orientation with friction and/or magnetics and/or grooves and/or ridges and/or removable dividers in a pre-determined size for preventing the tools and/or building materials from wearing a bottom surface and/or creating a hole in the bottom surface of the receptacle component. The protective tool pouch apparatus can be used as a standalone component and/or inserted into existing tool belts, arm belts, apron pockets, vest pockets, clothing pockets, holsters, bags, pouches, backpack pockets, etc.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
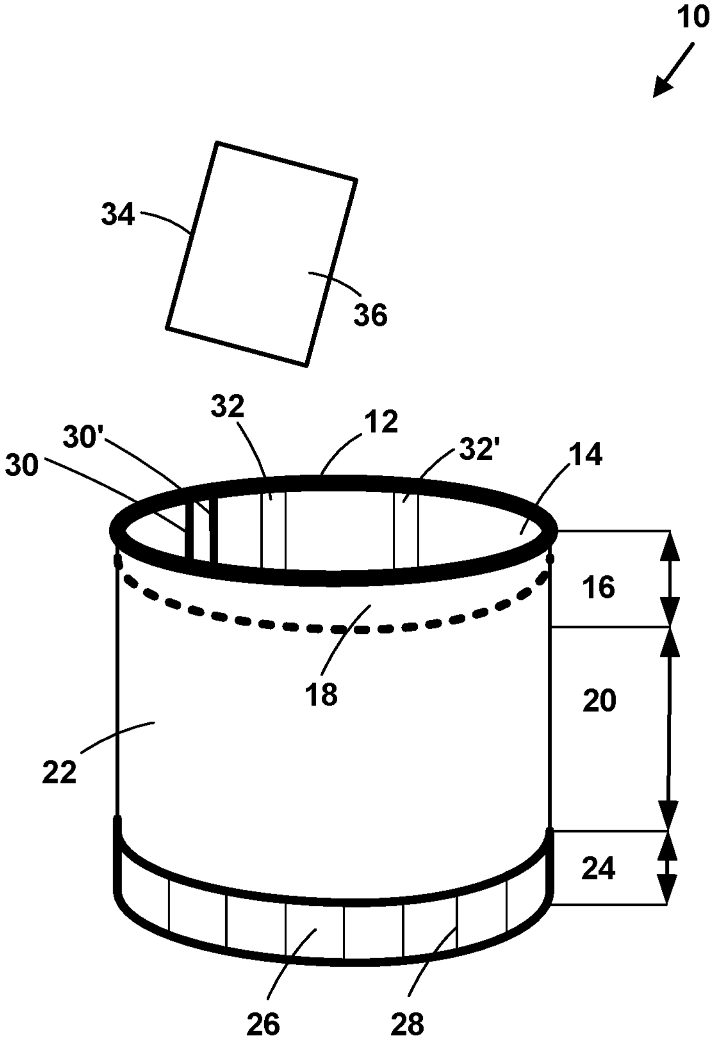
FIG. 1 is a block diagram illustrating a perspective view of a protective tool pouch apparatus.

FIG. 1 is a block diagram 10 illustrating an exemplary protective tool pouch apparatus 12.

The protective tool pouch apparatus 12 includes a receptacle component 14 for accepting and holding a tool and/or a building material. The receptacle component 14 includes a first receptacle portion 16 comprising a first flexible material 18 of a first pre-determined size, a second receptacle portion 20 comprising a second flexible material 22 of a second pre-determined size and a third receptacle portion 24 comprising a first rigid material 26 of a third pre-determined size. However, the present invention is not limited to this embodiment and other embodiments can be used to practice the invention.

The tools include, screwdrivers 40 (FIG. 2), wrenches 54, pliers, cutters, punches, drill bits, adjustable wrenches, socket wrench, hex key wrenches, taps, etc. However, the present invention is not limited to these tools and more, fewer and/or other different tools can be used to practice the invention.

The building materials include, but are not limited to, as nails, screws, bolts, rivets, electrical components, plumbing components, roofing components, heating, ventilation, air conditioning (HVAC) components, etc. However, the present invention is not limited to these building materials and more, fewer and/or other different building materials can be used to practice the invention.

In one embodiment, the first rigid material 26 includes plural reinforcing components 28, including but not limited to reinforcing ribs. The reinforcing components 28 may be a same and/or a different material used for the third rigid material 26. However, the present invention is not limited to such an embodiment and other embodiments with and/or without reinforcing components 28 in the third rigid material 26 can be used to practice the invention.

The first flexible material 18 for the first receptacle portion 16 further includes one more sets of ridges 30, 30 (only two of which is illustrated for simplicity) and/or receptacle grooves 32, 32' (only two of which is illustrated for simplicity) to help keep the tools and/or building materials in a vertical orientation. However, the present invention is not limited to this embodiment and other embodiments can be used to practice the invention.

The exemplary protective tool pouch apparatus 12 includes one or more removable divider components 34 comprising a second rigid material 36 insertable and removable from the receptacle component creating individual compartments for the tools or building materials. However, the present invention is not limited to the components described and more, fewer and/or other types of components can be used to practice the invention.

In one embodiment, the first flexible material 18 for the first receptacle portion 16 includes a flexible material including a surface with a desired coefficient of friction to prevent movement of the tools and/or building materials.

Equation (1) illustrates a formula for friction.

$$f=\mu N \quad (1)$$

where f=friction force, μ=coefficient of friction and N=normal force.

“Friction” is a force resisting a relative motion of material elements sliding against each other. Dry friction is a force that opposes the relative lateral motion of two solid surfaces in contact.

“Coefficient of friction” is ratio of a frictional force resisting a motion of two surfaces in contact to the normal force pressing the two surfaces together. Many Rubberized materials, plastic materials, and/or composite materials have a large coefficient of friction which opposes movement of tools and/or building materials when such tools and/or building materials are pressed against such materials in the protective tool pouch apparatus 12. The coefficient of friction is a ratio of a force to a force and therefore has no units.

Table 1 includes exemplary coefficients of friction from Barrett, “Fastener Design Manual,” NASA Reference Publication p. 1228, 1990.

TABLE 1

Coefficients of Static and Sliding Friction

| Materials | Static Dry | Static Greasy | Sliding Dry | Sliding Greasy |
|---|---|---|---|---|
| Hard steel on hard steel | 0.78 | 0.11 (3) | 0.42 | 0.029 (k) |
| | — | 0.23 (b) | — | 0.081 (e) |
| | — | 0.15 (c) | — | 0.080 (i) |
| | — | 0.11 (d) | — | 0.058 (j) |
| | — | 0.0075 (p) | — | 0.084 (d) |
| | — | 0.0052 (h) | — | 0.105 (k) |
| | — | — | — | 0.096 (l) |
| | — | — | — | 0.108 (m) |
| | — | — | — | 0.12 (a) |
| Mild steel on mild steel | 0.74 | — | 0.57 | 0.09 (a) |
| | — | — | — | 0.19 (u) |
| Hard steel on graphite | 0.21 | 0.09 (a) | — | — |
| Hard steel on babbitt | 0.70 | 0.23 (b) | 0.33 | 0.16 (b) |
| (ASTM No. 1) | — | 0.15 (c) | — | 0.06 (c) |
| | — | 0.08 (d) | — | 0.11 (d) |
| | — | 0.085 (e) | — | — |
| Hard steel on babbitt | 0.42 | 0.17 (b) | 0.35 | 0.14 (b) |
| (ASTM No. 8) | — | 0.11 (c) | — | 0.065 (c) |
| | — | 0.09 (d) | — | 0.07 (d) |
| | — | 0.08 (e) | — | 0.08 (h) |
| Hard steel on babbitt | — | 0.25 (b) | — | 0.13 (b) |
| (ASTM No. 10) | — | 0.12 (c) | — | 0.06 (c) |
| | — | 0.10 (d) | — | 0.055 (d) |
| | — | 0.11 (e) | — | — |
| Mild steel on cadmium silver | — | — | — | 0.097 (f) |
| Mild steel on phosphor bronze | — | — | 0.34 | 0.173 (f) |
| Mild steel on copper lead | — | — | — | 0.145 (f) |
| Mild steel on cast iron | — | 0.183 (c) | 0.23 | 0.133 (f) |
| Mild steel on lead | 0.95 | 0.5 (f) | 0.95 | 0.3 (f) |
| Nickel on mild steel | — | — | 0.64 | 0.178 (x) |
| Aluminum on mild steel | 0.61 | — | 0.47 | — |
| Magnesium on mild steel | — | — | 0.42 | — |
| Magnesium on magnesium | 0.6 | 0.08 (y) | — | — |
| Teflon on Teflon | 0.04 | — | — | 0.04 (0) |
| Teflon on steel | 0.04 | — | — | 0.04 (f) |
| Tungsten carbide on tungsten carbide | 0.2 | 0.12 (a) | — | — |
| Tungsten carbide on steel | 0.5 | 0.08 (a) | — | — |
| Tungsten carbide on copper | 0.35 | — | — | — |
| Tungsten carbide on iron | 0.8 | — | — | — |
| Bonded carbide on copper | 0.35 | — | — | — |
| Bonded carbide on iron | 0.8 | — | — | — |
| Cadmium on mild steel | — | — | 0.46 | — |
| Copper on mild steel | 0.53 | — | 0.36 | 0.18 (a) |
| Nickel on nickel | 1.10 | — | 0.53 | 0.12 (w) |
| Brass on mild steel | 0.51 | — | 0.44 | — |
| Brass on cast iron | — | — | 0.30 | — |
| Zinc on cast iron | 0.85 | — | 0.21 | — |
| Polystyrene on Steel | 0.35 | — | — | 0.05 (f) |
| Magnesium on cast iron | — | — | 0.25 | — |
| Copper on cast iron | 1.05 | — | 0.29 | — |
| Tin on cast iron | — | — | 0.32 | — |
| Lead on cast iron | — | — | 0.43 | — |
| Aluminum on aluminum | 1.05 | — | 1.4 | — |
| Glass on glass | 0.94 | 0.01 (p) | 0.40 | 0.09 (a) |
| | — | 0.005 (q) | — | 0.116 (v) |
| Carbon on glass | — | — | 0.18 | — |
| Garnet on mild steel | — | — | 0.39 | — |
| Glass on nickel | 0.78 | — | 0.56 | — |
| Copper on glass | 0.68 | — | 0.53 | — |
| Cast iron on cast iron | 1.10 | — | 0.15 | 0.070 (d) |
| | — | — | — | 0.064 (n) |
| Bronze on cast iron | — | — | 0.22 | 0.77 (n) |
| Oak on oak (parallel to grain) | 0.62 | — | 0.48 | 0.164 (r) |
| | — | — | — | 0.067 (s) |
| Oak on oak (perpendicular) | 0.54 | — | 0.32 | 0.072 (s) |
| Leather on oak (parallel) | 0.61 | — | 0.52 | — |
| Cast iron on oak | — | — | 0.49 | 0.075 (n) |
| Leather on cast iron | — | — | 0.56 | 0.36 (t) |
| | — | — | — | 0.13 (n) |
| Laminated plastic on steel | — | — | 0.35 | 0.05 (f) |
| Fluted rubber bearing on steel | — | — | — | 0.05 (t) |
| Steel on rubber | 0.86 | — | — | — |

In one embodiment the first flexible material 18 for the first receptacle portion 16, includes, but is not limited to, a rubberized material, plastic material, and/or composite material, etc. However, the present invention is not limited to these materials and other materials can be used to practice the invention.

"Rubber" is an elastic polymeric substance made from a latex of a tropical plant and or synthetically. "Plastic" is one of many synthetic material made from a wide range of organic polymers such as polyethylene, polystyrene, polyvinyl chloride (PVC), nylon, etc., that can be molded into shape while soft and then set into slightly elastic form. A "composite material" is a material which is produced from two or more constituent materials. These constituent materials have notably dissimilar chemical and/or physical properties and are merged to create a material with properties unlike the individual elements.

For example, a coefficient of friction for rubber against steel, a common material used for tools, is about 0.86, polystyrene against steel is about, 0.35, etc., wherein a larger number for a coefficient of friction requires a larger force to move an object (e.g., tool, building material, etc.) against a surface made of such a material. Different types of plastics and/or composite materials have different coefficients of friction which are available in standardized tables.

The first flexible material 18 for the first receptacle portion 16 with the desired coefficient of friction helps keeps tools and/or building materials in vertical orientation in the protective tool pouch apparatus 12 and helps prevent the tools and/or building materials from slipping in a non-vertical orientation including, but not limited to, a semi-horizontal and/or horizontal orientation. However, the present invention is not limited to such an embodiment and other embodiments can be used to practice the invention.

In another embodiment, the first flexible material 18 for the first receptacle portion 16 includes a magnetic material. However, the present invention is not limited to such an embodiment and other materials may be used to practice the invention.

In another embodiment, the first receptacle portion 16, the second receptacle portion 20, the third receptacle portion 26, one or more set of ridges 30 and/or receptacle grooves 32 and/or the one or more removable divider components 34, include a magnetic material. However, the present invention is not limited to such an embodiment and other materials may be used to practice the invention.

A "magnetic material" is a material that experiences a force when placed in a magnetic field. Although all magnetic materials are metallic, not all metals are magnetic. Common metals that attach to magnetic materials include: iron, steel, nickel, cobalt, etc. Copper and aluminum are metals which are included in many tools and building materials are not magnetic. Rubber and plastic are also not magnetic.

The magnetic materials help keep any tools and/or building materials that include any magnetic metals in a vertical position in the protective tool pouch apparatus 12 and help prevent any tools and/or building materials that include any magnetic metals from slipping into a semi-horizontal and/or horizontal orientation.

In another embodiment, the first flexible material 18 for the first receptacle portion 16 includes a combination of a rubberized material, plastic material, composite material with a desired coefficient of friction and/or magnetic material. In such an embodiment, this combination helps keep both any tools and/or building materials that include any magnetic metals with magnetics in a vertical position and any tools and/or building materials that do not include any magnetic metals in a vertical position with friction. However, the present invention is not limited to such embodiments and other combinations of materials be used to practice the invention.

In one embodiment, the first pre-determined size of the first flexible material 18 for the first receptacle portion 16 includes about one to about three inches (i.e., about 2.54 centimeters (cm) to about 7.62 cm). However, the present invention is not limited to such an embodiment and other pre-determined sizes can be used to practice the invention.

The second receptacle portion 20 comprising the second flexible material 22 of a second pre-determined size includes, but is not limited to, a leather, natural and synthetic fabrics, plastic, nylon, KEVLAR, and/or composite material. The second receptacle portion 20 comprises a body portion of the protective tool pouch apparatus 12.

"Leather" includes a material made from the skin of an animal by tanning or a similar process. "Fabric" includes cloth and/or other material produced by weaving or knitting fibers. "Nylon" includes a tough, lightweight, elastic synthetic polymer with a protein-like chemical structure, able to be produced as filaments, sheets, and/or molded objects.

One type of synthetic fabric includes KEVLAR. KEVLAR (i.e., para-aramid) is a heat-resistant and strong synthetic fiber used in synthetic fabrics. KEVLAR is used in bullet-proof vests and other protective clothing and has a high resistance to puncturing. However, the present invention is not limited to KEVLAR and other synthetic fabrics can be used to practice the invention.

One type of flexible plastic includes Low Density PolyEthylene (LDPE). LPPE is a soft, flexible, lightweight plastic material. LDPE is noted for its low temperature flexibility, toughness, and corrosion resistance. However, the present invention is not limited to LPPE and other flexible plastics can be used to practice the invention.

The present invention is also not limited to such embodiments and other materials can be used for the second flexible material 22 for the second receptacle portion 20 to practice the invention.

In one embodiment, the second pre-determined size of the second flexible material 22 for the second receptacle portion 20 includes about three inches to about ten inches (i.e., about 7.62 cm about to 25.4 cm). The second pre-determined size includes plural different sizes to be compatible for insertion into plural different existing tool belts, arm belts, apron pockets vest pockets clothing pockets, holsters, bags, pouches, backpack pockets, etc. and/or for different sized and shaped tools and/or building materials. However, the present invention is not limited to such an embodiment and other pre-determined sizes can be used to practice the invention.

The third receptacle portion 24 comprising the first rigid material 26 of the third pre-determined size. The first rigid material 26 helps prevent tools and building materials from wearing and/or creating holes in a bottom surface of the protective tool pouch apparatus 12.

The first rigid material 26 and the second rigid material 36 includes, but is not limited to a wood, metal, plastic, rubber and/or composite material. However, the present invention is not limited to such embodiments and rigid materials can be used to practice the invention.

In one embodiment, the wood includes, but is not limited to, bamboo, oak, ash, walnut, maple and/or beech woods. However, the present invention is not limited to these woods and other woods can be used to practice the invention.

In one embodiment the metals include, but is not limited to, iron, aluminum, steel, stainless steel, brass, bronze, other metal alloys, and/or other metals. However, the present invention is not limited to these metals and other metals can be used to practice the invention.

In one embodiment, the plastic includes, but is not limited to, Polyethylene terephthalate (PETE or PET), Polyethylene (PE), Polyvinyl Chloride (PVC), Polypropylene (PP), Polylactic Acid (PLA), Polycarbonate (PC), Polyoxymethylene, (POM), Acrylonitrile Butadiene Styrene (ABS) and/or other types of rigid plastics.

In one embodiment, the third pre-determined size of the first rigid material 24 for the third receptacle portion 26 includes about one to three inches (i.e., about 2.54 centimeters (cm) to 7.62 cm). However, the present invention is not limited to such an embodiment and other pre-determined sizes can be used to practice the invention.

The whole apparatus 12 and/or separate components thereof may be injection molded, extruded, pultruded, pullwinded and/or, sewn, 3D printed and/or manufactured and/or produced with other manufacturing techniques. However, the present invention is not limited to such an embodiment and more, fewer or other types of manufacturing techniques can be used to practice the invention.

"Injection molding" is a manufacturing process for producing parts by injecting molten material into a mold. Injection molding can be performed with plural different materials including metals, glasses, plastics, and most commonly thermoplastics and thermosetting polymers.

"Extrusion" is a manufacturing process where a material is pushed through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

Feedstock for extrusion may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material.

"Pultrusion" is a continuous process for manufacture of materials with a constant cross-section. Reinforced fibers (e.g., fiberglass fibers, etc.) are pulled through a resin, possibly followed by a separate preforming system, and into a heated die, where the resin undergoes polymerization. Pultrusion is not limited to thermosetting polymers or polymides. More recently, pultrusion has been successfully used with thermoplastic matrices such either by powder impregnation of fibers or by surrounding it with sheet material of a thermoplastic/polymide matrix, which is then heated. Fiberglass is a textile fabric made from woven glass filaments.

In one embodiment, components of the apparatus 12 are produced with an overwrapping transverse winding process that combines continuous filament winding with a pultrusion manufacturing process to produce a pultruded pullwound hollow cylindrical structure with the shape of hollow cylindrical structure that is used for components in apparatus 12.

The "pullwinding" process incorporates plural longitudinal reinforcement fibers with plural helical-wound (e.g., hoop, etc.) layers, providing maximum torsional properties and hoop strength. A self-contained inline winding unit is used with a pultrusion machine for feeding angled fibers between layers of unidirectional fibers before curing in a pultrusion die. The plural longitudinal re-enforcement fibers are used for axial and bending resistance while the plural helical-wound fibers are used for hoop tension and compression resistance. The pullwinding equipment is comprised of twin winding heads which revolve in opposite directions over a spindle. However, the present invention is not limited to such an embodiment and other embodiments can also be used to practice the invention.

In one embodiment, the whole apparatus 12 and/or separate components thereof are 3D printed. However, the present invention is not limited to such an embodiment and more, fewer or other types manufacturing techniques can be used to practice the invention.

A "3D printer" include 3D printing or "Additive manufacturing." 3D printing is a process of making a three-dimensional solid object of virtually any shape from a digital model. 3D printing is achieved using an "additive process," where successive layers of material are laid down in different shapes. 3D printing is also considered distinct from traditional machining techniques, which mostly rely on the removal of material by methods such as cutting or drilling and are "subtractive" processes.

In one embodiment, the whole apparatus 12 and/or separate components thereof are manufactured with casting, melt molding, compression molding and/or transfer molding. However, the present invention is not limited to such manufacturing techniques and other techniques can be used to practice the invention.

Casting includes creating an object made by pouring molten metal or other material into a mold. Melt molding includes combining polymer and porogen particles to in a mold and heated above the polymer's glass transition temperature (e.g., for amorphous polymers, etc.) or melting temperature (e.g. for semi-crystalline polymers, etc.). Compression molding is a process of molding in which a feeding material is placed into an open, heated mold cavity. The mold is then closed with a top plug and compressed with large hydraulic presses in order to have the material contact all areas of the mold. The charge cures in the heated mold. Transfer molding is a manufacturing process in which casting material is forced into a mold.

In one embodiment, the components of the protective tool pouch apparatus 12 is manufactured in one solid color and/or plural different colors. For example, the first receptacle portion 16 comprising the first flexible material 18 of the first pre-determined size includes a safety color (e.g., red, orange, yellow, etc.) to allow a user to more easily visually determine where an opening in the protective tool pouch apparatus 12 is to insert and remove tools and/or building materials. The protective tool pouch apparatus 12 may also be manufactured in other ecstatically pleasing colors and/or colors to match existing and/or new product lines and/or trademarked and/or other colors used for product branding. However, the present invention is not limited to such embodiments and other embodiments with and/or without colors can be used to practice the invention.

In one embodiment, the first flexible material 18 includes a colored portion with a color selected (e.g., red, yellow, orange, etc.) for allowing a user to more easily visually determine where an opening in the protective tool pouch apparatus 12 is located to insert and remove tools and/or building materials. However, the present invention is not limited to such embodiments and other embodiments with and/or without colors can be used to practice the invention.

In one embodiment, the first receptacle portion 16 comprising the first flexible material 18 is a same material as the second receptacle portion 20 comprising the second flexible material 22. However, the present invention is not limited to such an embodiment and other embodiments can be used to practice the invention.

In one embodiment, the first receptacle portion 16 comprising the first flexible material 18 is dipped into a material and/or has its surfaces coated with a material that becomes rigid upon drying such as a liquid rubberized, plastic, metal material, etc. However, the present invention is not limited to such and embodiment and the invention can be practiced with and/or without dipping the third receptacle portion 24 into any materials that become rigid upon drying.

In one embodiment, the first receptacle portion 16 comprising the first flexible material 18 is a same material as the second receptacle portion 20 comprising the second flexible material 22 and a same material as the third receptacle portion 24 comprising the first rigid material 26. In such an embodiment, the third receptacle portion 24 dipped into a material and/or has its surfaces coated with a material that becomes rigid upon drying such as a rubberized, plastic, metal, material, etc. However, the present invention is not limited to such an embodiment and other embodiments can be used to practice the invention.

In one embodiment, the third receptacle portion 24 comprising the first rigid material 26 is a same material as the second receptacle portion 20 that is dipped into a material and/or has its surfaces coated with a material that becomes rigid upon drying such as a rubberized, plastic, metal, material, etc. However, the present invention is not limited to such and embodiment and the invention can be practiced with and/or without dipping the third receptacle portion 24 into any materials that become rigid upon drying.

Various other combinations of a same and/or different types of materials and/or dipping and/or surface coating for the protective tool pouch apparatus 12 can be used to practice the invention.

Figure 7:
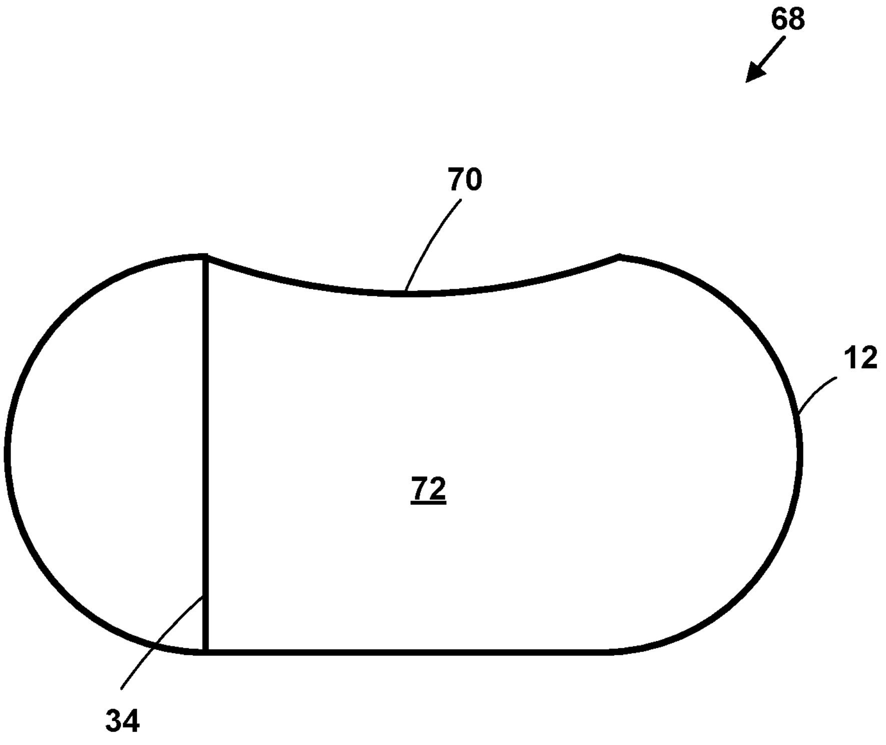
FIG. 7 is a block diagram illustrating a top view of the protective tool pouch apparatus.

In one embodiment, the first receptacle portion 16 comprises a fourth rigid material, the second receptacle portion 20 comprises the fourth rigid material, and the third receptacle portion 24 comprises the fourth rigid material 72 (FIG. 7). However, the present invention is not limited to such an embodiment and other embodiments can be used to practice the invention.

In such an embodiment, the fourth rigid material 72 includes, but is not limited to a wood, metal, plastic, rubber and/or composite material. However, the present invention is not limited to such embodiments and rigid materials can be used to practice the invention.

Figure 2:
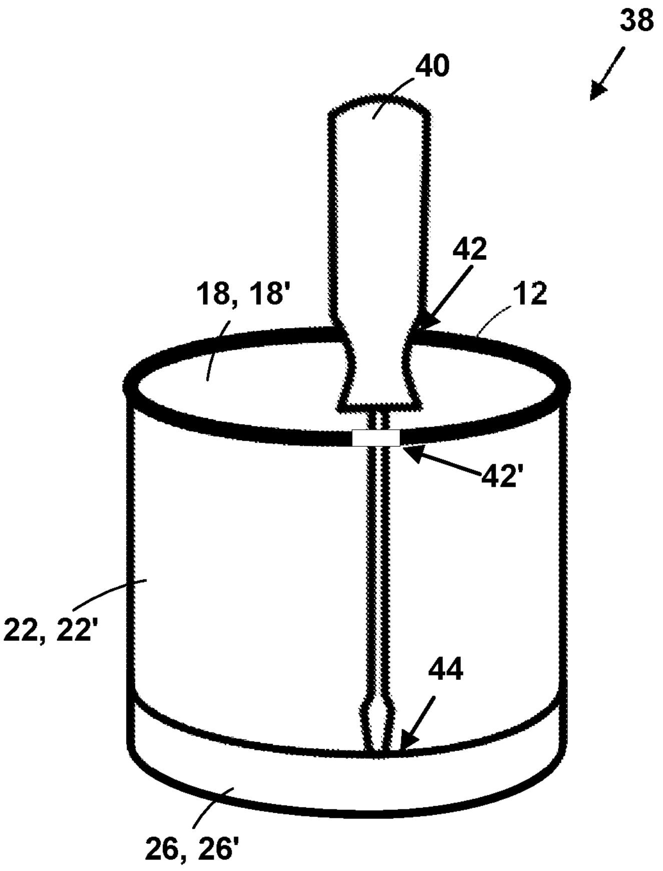
FIG. 2 is a block diagram illustrating a see-through perspective view the protective tool pouch apparatus.

FIG. 2 is a block diagram 38 illustrating a see-through perspective view the protective tool pouch apparatus 12.

FIG. 2 illustrates a tool 40, a screwdriver placed against the first the first flexible material 18 held in a vertical orientation (e.g., with friction 42 and/or magnetics 42', etc.) and also in contact 44 with the first rigid material 26.

In one embodiment, the protective tool pouch apparatus 12 is manufactured in a pre-determined size and shape to be used as standalone component in tool belts 52 (FIG. 3), aprons 51, arm bands 49, holsters, bags, pouches, user pockets, etc.

In another embodiment, the protective tool pouch apparatus 12 is manufactured in a pre-determined size and shape to be insertable and/or removable into existing tool belts 52, aprons 51, arm bands 49, holsters, bags, pouches, clothing pockets, backpack pockets, etc.

The insertable and/or removable embodiment allows the protective tool pouch apparatus 12 to be used in existing tool belts, aprons, holsters, bags, pouches, clothing pockets, backpack pockets, etc. that have already been purchased by a user that may have significant wear and/or include one or more holes in their bottom surfaces and therefore is used to the extend the usable life of such items.

The insertable and/or removable embodiment also allows the protective tool pouch apparatus 12 to be used in new tool belts, arm belts, apron pockets, vest pockets, holsters, bags, pouches, clothing pockets, backpack pockets, etc. that have been purchased new to prevent such significant wear and/or one or more holes in their bottom surfaces. However, the present invention is not limited to such embodiments and other embodiments can be used to practice the invention.

Figure 3:
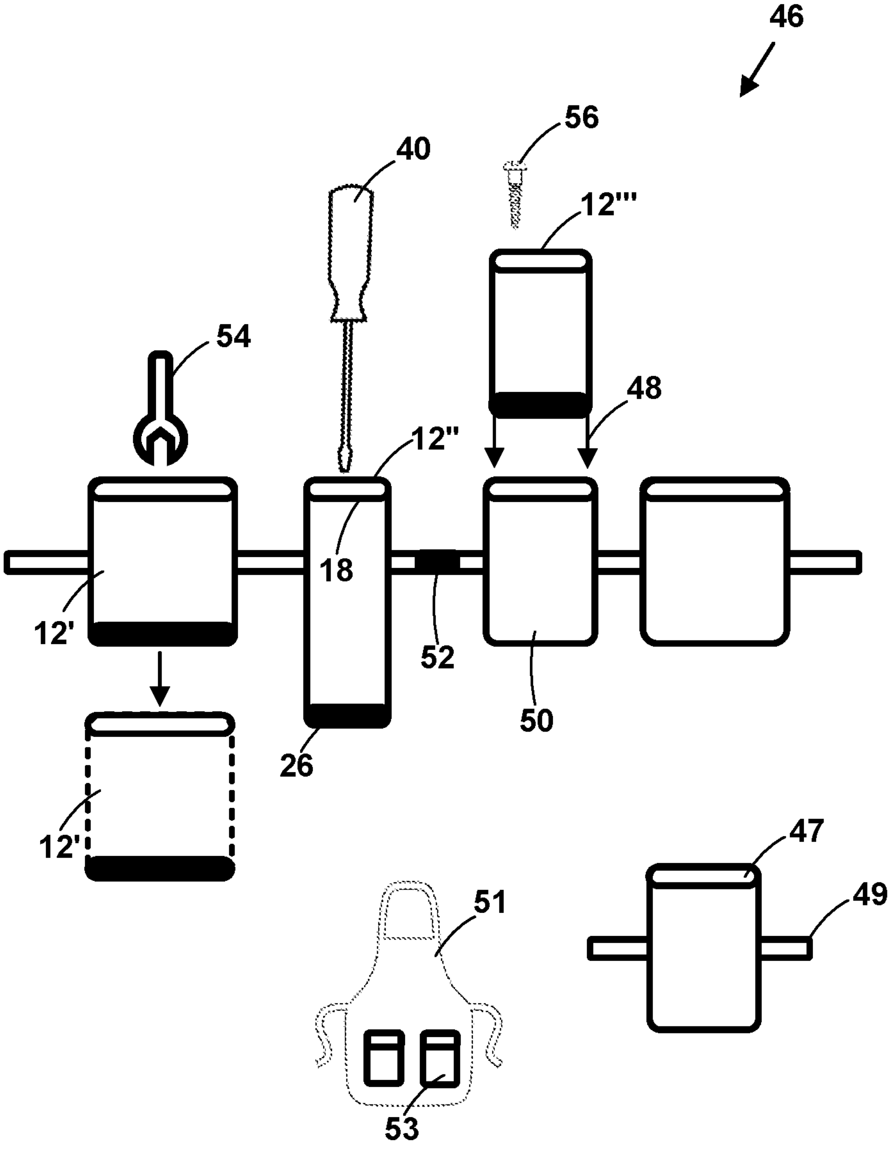
FIG. 3 is a block diagram illustrating a perspective view of the protective tool pouch apparatus used as a component and as an insert in an existing tool belt.

FIG. 3 is a block diagram 46 illustrating a perspective view of the protective tool pouch apparatus 12 used as a removable component 12' and/or integral component 12" and/or as an insert 12''' insertable and/or removable 48 and/or an existing receptacle component 47 on an arm band 49, and/or an existing pocket 53 in apron 51 and/or in an existing receptacle component 50 on a tool belt 52. The protective tool pouch apparatus 12 accepts tools 40, 54 building materials 56, etc.

FIG. 3 illustrates the protective tool pouch apparatus 12 as a pouch receptacle for use on tool belts 52. However, the present invention is not limited to the protective tool pouch apparatus 12 manufactured as pouch receptacle.

In other embodiments, the protective tool pouch apparatus 12 is manufactured in other specific sizes and shapes, including but not limited to, specific sizes and shapes for aprons 51, arm bands 49, holsters, bags, pouches, clothing pockets, backpack pockets, etc. In other embodiments, the protective tool pouch apparatus 12 is manufactured for other types of bags, backpacks, containers, etc.

In one embodiment, the protective tool pouch apparatus 12 is manufactured as a single component. In another embodiment, the first, second and third receptacle components 16, 20, 24 are manufactured and/or created separately and the separate components are combined into the protective tool pouch apparatus 12. There are various other combinations for manufacturing the first, second and third receptacle components 16, 20, 24 of the protective tool pouch apparatus 12 and the present invention is not limited to the combinations described herein.

In one embodiment, the protective tool pouch apparatus 12 is specifically sized and shaped to receive a specific type of tool (e.g., screwdriver, wrench, pliers, etc.) and/or specific type of building material (e.g., screw, nail, rivet, bolt, etc.) However, the present invention is not limited to this embodiment and other embodiments can be used to practice the invention including manufacturing the protective tool pouch apparatus 12 in one or more generic and/or standard sizes and shapes.

In one embodiment, the protective tool pouch apparatus 12 includes a receptacle component 14 includes a first receptacle portion 16 comprising a first rigid material 18' of a first pre-determined size, a second receptacle portion 20 comprising a second rigid material 22' of a second pre-determined size and a third receptacle portion 24 comprising a third rigid material 26' of a third pre-determined size. However, the present invention is not limited to such an embodiment and other embodiments can be used to practice the invention.

In one embodiment, the protective tool pouch apparatus 12 includes a receptacle component 14 includes a first receptacle portion 16 comprising a first rigid material 18' of a first pre-determined size, a second receptacle portion 20 comprising a second flexible material 22' of a second pre-determined size and a third receptacle portion 24 comprising a third rigid material 26' of a third pre-determined size. However, the present invention is not limited to such an embodiment and other embodiments can be used to practice the invention.

In one embodiment, the protective tool pouch apparatus 12 includes a receptacle component 14 includes a first receptacle portion 16 comprising a first flexible material 18 of a first pre-determined size, a second receptacle portion 20 comprising a second flexible material 22 of a second pre-determined size and a third receptacle portion 24 comprising a third rigid material 26' of a third pre-determined size. However, the present invention is not limited to such an embodiment and other embodiments can be used to practice the invention.

There are various other combinations of rigid and flexible materials that can be used for the three portions 16, 20, 24 of the protective tool pouch apparatus 12 to practice the invention.

Figure 4:
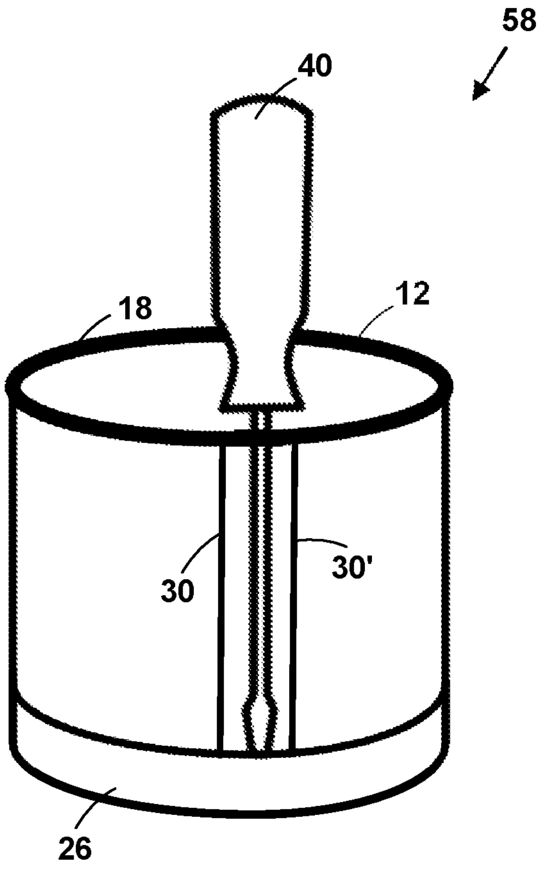
FIG. 4 is a block diagram illustrating a perspective view of the protective tool pouch apparatus including ridges.

FIG. 4 is a block diagram 58 illustrating a perspective view of the protective tool pouch apparatus including ridges 30, 30'.

FIG. 4 illustrates a tool 40 within a set ridges 30, 30'. The set of receptacle ridges 30, 30' keep the tool 40 (e.g., screw driver, etc.) in a vertical orientation.

Figure 5:
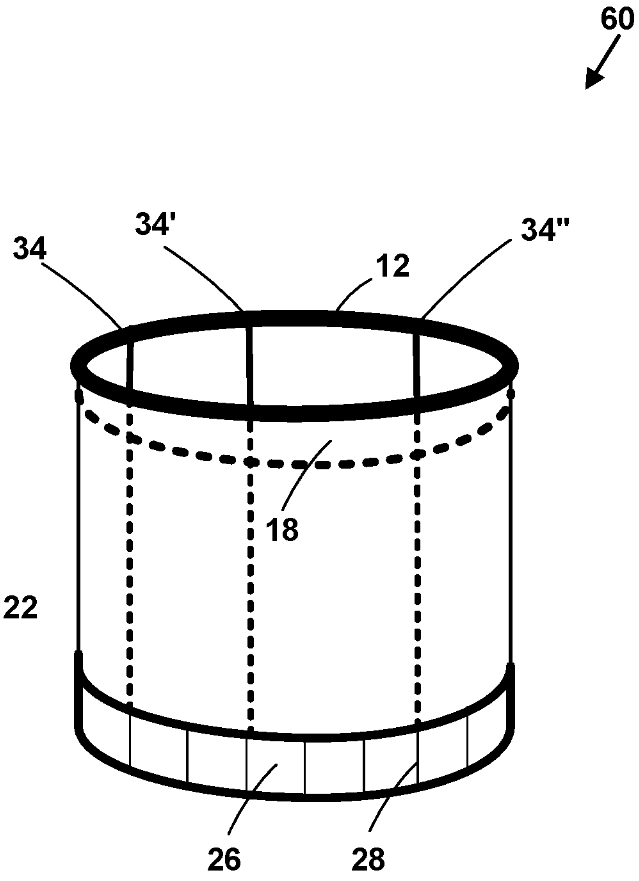
FIG. 5 is a block diagram illustrating a perspective view of the protective tool pouch apparatus with dividers.

FIG. 5 is a block diagram 60 illustrating a perspective view of the protective tool pouch apparatus 12 with dividers 34, 34', 34"

In FIG. 5, three dividers 34, 34', 34" are illustrated. In one embodiment the one or more dividers 34, 34', 34" are insertable and removable from the one or more receptacle grooves 32, 32. In another embodiment, the one or more dividers 34, 34', 34" are directly insertable and removable from the protective tool pouch apparatus 12. However, the present invention is not limited to such an embodiment and other embodiments can be used to practice the invention.

Figure 6:
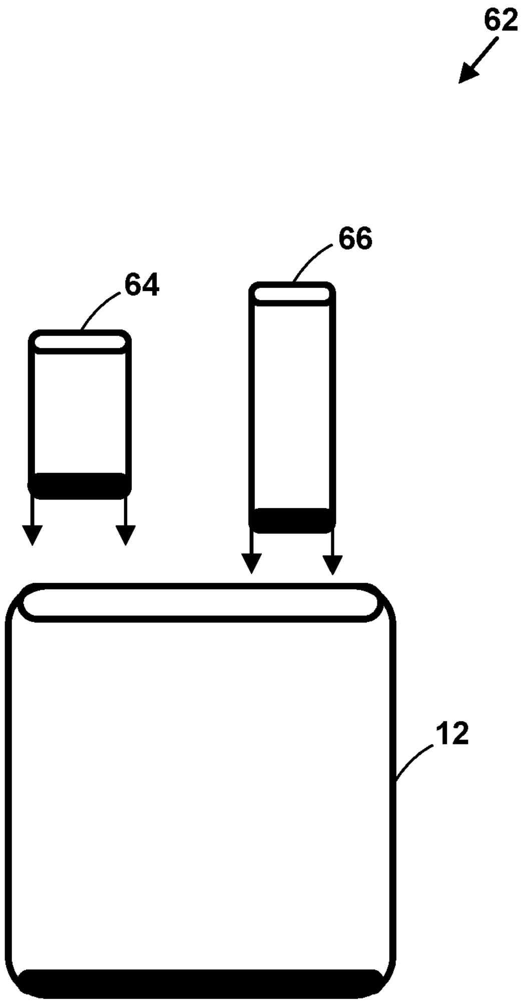
FIG. 6 is a block diagram illustrating a perspective view of the protective tool pouch apparatus with one or more rigid receptacle components.

FIG. 6 is a block diagram 62 illustrating a perspective view of the protective tool pouch apparatus with one or more rigid receptacle components 64, 66.

In FIG. 6 the one or more rigid receptacle components 64, 66 insertable and removable from the receptacle component for holding tools or building materials of a specific size and shape (e.g., screw driver 40, pliers, wrench 54, cutters, etc.).

In one embodiment, the one or more rigid receptacle components 64, 66 include, but is not limited to a wood, metal, plastic, rubber and/or composite material. However, the present invention is not limited to such embodiments and rigid materials can be used to practice the invention.

FIG. 7 is a block diagram 68 illustrating a top view of the protective tool pouch apparatus 12.

In FIG. 7, the protective tool pouch apparatus 12 includes one divider component 34 and a back surface with curved component 70 to allow the protected tool pouch apparatus 12 to engage an arm or a leg of a user when the protected tool pouch apparatus 12 is used in an existing receptacle component 50 on a tool belt 52 and/or in an existing receptacle component 57 on an arm band 59, and/or in a pocket 53 in an apron 51 and/or other items. However, the present invention is not limited to such an embodiment and other embodiments can be used to practice the invention.

In one embodiment, the whole protective tool pouch apparatus 12 including the first receptacle portion 16, second receptacle portion 20 and third receptacle portion 24 each comprise a fourth rigid material 72 including the curved component 70. The fourth rigid material 72 includes, but is not limited to a wood, metal, plastic, rubber and/or composite material. In one embodiment, the whole protective tool pouch apparatus 12 with the fourth rigid material 72 is 3D printed. However, the present invention is not limited to such embodiments and rigid materials and other manufacturing methods can be used to practice the invention.

A protective tool pouch apparatus is presented herein. The protective tool pouch apparatus includes a receptacle component for accepting and holding tools and/or building materials. The protective tool pouch apparatus includes keeping tools and/or building materials in a vertical orientation with friction and/or magnetics and/or grooves and/or ridges and/or removable dividers in a pre-determined size for preventing the tools and/or building materials from wearing a bottom surface and/or creating a hole in the bottom surface of the receptacle component. The protective tool pouch apparatus can be used as a standalone component and/or inserted into existing tool belts, arm belts, apron pockets, holsters, bags, pouches, clothing pockets, backpack pockets, etc.

It should be understood that the architecture, programs, processes, methods and systems described herein are not related or limited to any particular type of computer or network system (hardware or software), unless indicated otherwise. Various types specialized systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware and/or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the various detailed descriptions and equivalents thereto are claimed as the invention.

We claim:

1. A protective tool pouch apparatus, comprising in combination:

a receptacle component for accepting and holding a tool or a building material, the receptacle component including:

a first receptacle portion comprising a first flexible material of a first pre-determined size, the first flexible material including a surface with a desired coefficient of friction that keeps the tools or the building materials in vertical orientation in the protective tool pouch apparatus and prevents the tools or building materials from slipping into a non-vertical orientation when placed against the surface of the first flexible material, and the first flexible material further including one or more set of ridges or receptacle grooves to keep the tools or building materials in a vertical orientation;

a second receptacle portion comprising a second flexible material of a second pre-determined size comprising a body portion of the protective tool pouch apparatus;

a third receptacle portion comprising a first rigid material of a third pre-determined size for preventing the tools or building materials from wearing a bottom surface or creating a hole in the bottom surface of the receptacle component; and one or more removable divider components comprising a second rigid material insertable and removable from the receptacle component creating individual compartments for the tools or building materials.

2. The protective tool pouch apparatus of claim 1, wherein the first flexible material for the first receptacle portion includes, a rubberized material, plastic material, or composite material.

3. The protective tool pouch apparatus of claim 1, wherein the first flexible material for the first receptacle portion includes a magnetic material.

4. The protective tool pouch apparatus of claim 1, wherein the second flexible material includes leather, natural and synthetic fabrics, plastic, nylon, KEVLAR or composite materials.

5. The protective tool pouch apparatus of claim 1, wherein the first rigid material and the second rigid material includes a wood, metal, plastic, rubber or composite material.

6. The protective tool pouch apparatus of claim 1, wherein the desired coefficient of friction of the surface of the first flexible material is about 0.35 to about 0.86.

7. The protective tool pouch apparatus of claim 1, wherein the first rigid material includes a plurality of reinforcing components.

8. The protective tool pouch apparatus of claim 1, wherein a whole protective tool pouch apparatus, or separate components thereof, are manufactured or produced with manufacturing techniques with one or more of: injection molding, extrusion, pultrusion, pull-winding, sewing, 3D printing, casting, melt molding, compression molding or transfer molding.

9. The protective tool pouch apparatus of claim 1, wherein the second pre-determined size includes a plurality of different sizes to be compatible for insertion into a plurality of different existing tool belts, arm belts apron pockets, vest pockets, holsters, bags, pouches, clothing pockets or back pack pockets for different sized and shaped tools or building materials.

10. The protective tool pouch apparatus of claim 1, wherein the building materials include nails, screws, bolts, rivets, electrical components, plumbing components, roofing components or heating, ventilation, air conditioning (HVAC) components.

11. The protective tool pouch apparatus of claim 1, wherein the third receptacle portion, the one or more set of ridges or receptacle grooves or the one or more removable divider components include a magnetic material.

12. The protective tool pouch apparatus of claim 1, further including one or more rigid receptacle components insertable and removable from the receptacle component for holding tools or building materials of a specific size and shape.

13. The protective tool pouch apparatus of claim 12, the one or more rigid receptacle components include a wood, metal, plastic, rubber or composite material.

14. The protective tool pouch apparatus of claim 1, wherein components of the protective tool pouch apparatus are manufactured in one solid color or a plurality of different colors.

15. The protective tool pouch apparatus of claim 14, wherein a color selected for the first receptacle portion of the protect tool apparatus allows a user to more easily visually determine where an opening in the protective tool pouch apparatus is located to insert and remove tools or building materials.

16. The protective tool pouch apparatus of claim 1, wherein the protective tool pouch apparatus as a whole is specifically sized and shaped for insertion into a plurality of different existing tool belts, arm belts, apron pockets, vest pockets, clothing pockets, holsters, bags, pouches or backpack pockets.

17. The protective tool pouch apparatus of claim 1, wherein components of the protective tool pouch apparatus are specifically sized and shaped different sized and shaped tools or different sized and shaped building materials.

18. A protective tool pouch apparatus, comprising in combination:

a receptacle component for accepting and holding a tool or a building material, the receptacle component including:

a first receptacle portion comprising a first rigid material of a first pre-determined size, the first rigid material including a surface with a desired coefficient of friction that keeps the tools or the building materials in vertical orientation in the protective tool pouch apparatus and prevents the tools or building materials from slipping into a non-vertical orientation when placed against the surface of the first rigid material, and the first rigid material further including one or more set of ridges or one or more receptacle grooves to keep the tools or building materials in a vertical orientation, and the first rigid material further including a colored portion with a color selected for allowing a user to more easily visually determine where an opening in the protective tool pouch apparatus is located to insert and remove tools or building materials;

a second receptacle portion comprising the first rigid material of a second pre-determined size comprising a body portion of the protective tool pouch apparatus;

a third receptacle portion comprising the first rigid material of a third pre-determined size for preventing the tools or building materials from wearing a bottom surface or creating a hole in the bottom surface of the receptacle component;

one or more removable divider components comprising the first rigid material insertable and removable from the one or more receptacle grooves receptacles component creating individual compartments for the tools or building materials; and a curved component on a back surface of the first, second and third receptacle portion to engage an arm or a leg of a user.

19. The protective tool pouch apparatus of claim 18, wherein components of the protective tool pouch apparatus are specifically sized and shaped for insertion into a plurality of different existing tool belts, arm belts, aprons, holsters, bags, pouches, clothing pockets, backpack pockets, for different sized and shaped tools or building materials.

20. The protective tool pouch apparatus of claim 18 one or more removable divider components comprise a magnetic material.

* * * * *